Figure 1:
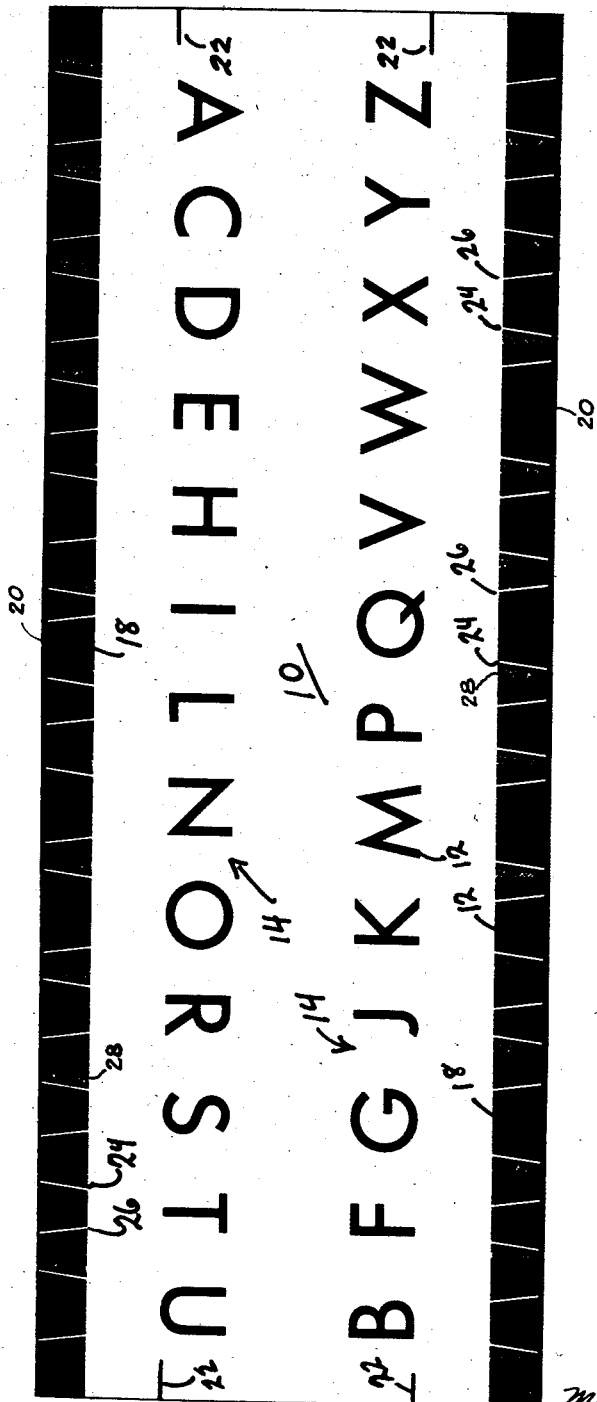

June 16, 1959 E. RONDTHALER ET AL 2,890,634
PHOTOTYPOGRAPHY
Filed July 21, 1954 3 Sheets-Sheet 1

INVENTORS
EDWARD RONDTHALER
BY HAROLD A. HORMAN

THEIR ATTORNEYS

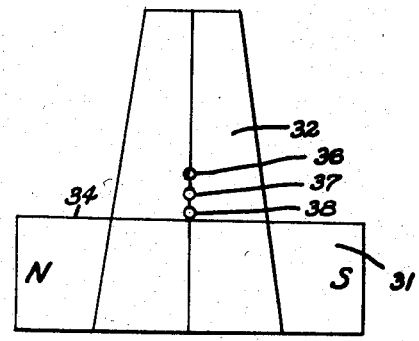
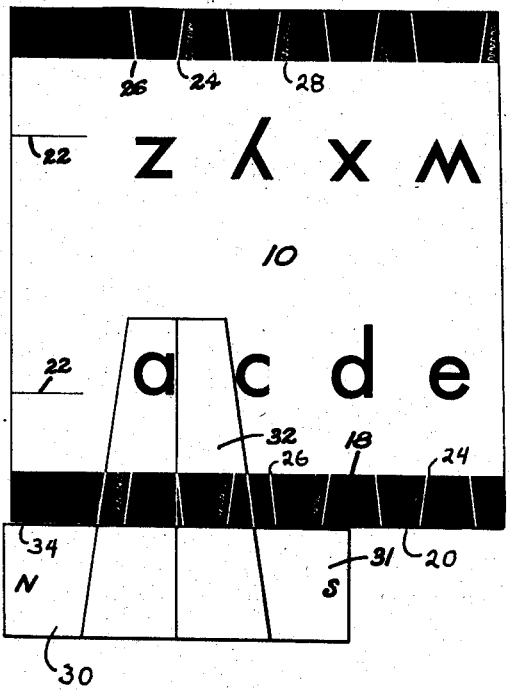

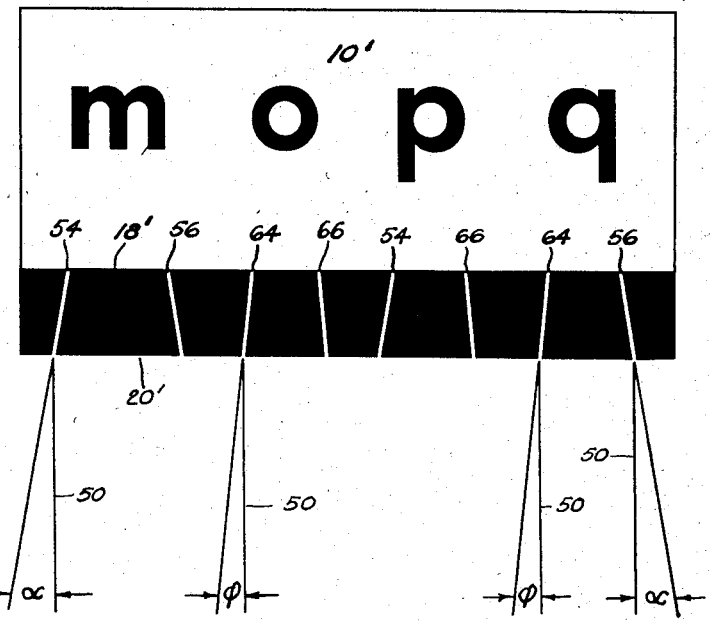
Fig. 6
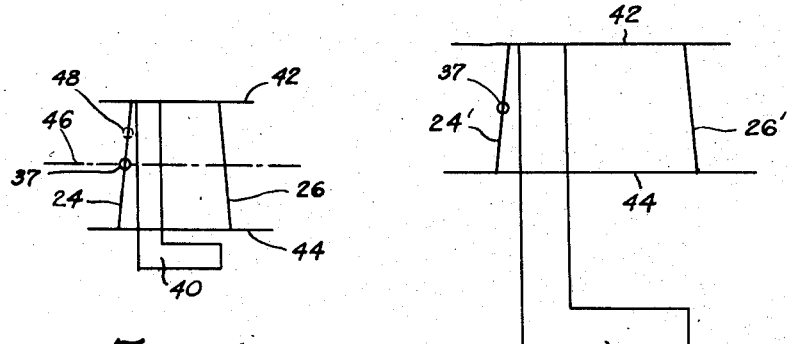
Fig. 4
Fig. 5
INVENTORS
EDWARD RONDTHALER
BY HAROLD A. HORMAN
THEIR ATTORNEYS

United States Patent Office 2,890,634
Patented June 16, 1959

2,890,634

PHOTOTYPOGRAPHY

Edward Rondthaler, Croton-on-Hudson, and Harold A. Horman, North Tarrytown, N.Y.

Application July 21, 1954, Serial No. 444,812

9 Claims. (Cl. 95—4.5)

The present invention relates to new and improved phototypographic alphabetical stencils or negatives.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description serve to explain the principles of the invention.

The drawings illustrate a present preferred and illustrative embodiment of the invention, the illustrative stencil being shown as a transparency in plan view, that is, it is shown with those areas in black which are to be eventually reproduced in black, while the white areas indicate those areas which are to be reproduced as white, it being understood that in the drawing, the black areas represent those areas which are usually transparent, while the white areas represent those areas which are usually opaque on the stencil, although for use in certain processes of reproduction, these areas may be reversed.

The present invention has for its object the provision of novel and improved alphabet stencils of general application in phototypography which simplify and accelerate the phooto-composition of a line of textual matter, and insure the proper spacing of the various letters of the phototypographically composed matter. A further object is the provision of a novel and improved stencil in which the letter elements are arranged in a novel manner with respect to each other and with respect to their spacing indicia so that the stencil may be used for letter-by-letter composition by even relatively inexperienced operators for the production of properly composed text matter. Another object of the invention is the provision of novel and improved indicia means on the stencils to compensate for the variance in spacing requirements arising from the particular configuration of individual letters. An additional object is the provision of a series of novel and improved stencils bearing letter elements of varying point size and having inter-related spacing indicia to automatically compensate for the variance in point size.

Heretofore, alphabet stencils for phototypography have usually had the letter elements arranged either in a circular sequence, or in one or more lines in alphabetical sequence or in haphazard arrangements, and where indexing means have been provided the indicia have not provided all of the necessary means for insuring proper and predetermined variable spacing of the letter elements in the finished composition.

According to the present invention, the letter elements are arranged in a non-alphabetical sequence, but in accordance with their frequency of occurrence in the language being used, and for the purpose of this description this will be considered to be normal English composition or textual matter. Instead of a purely alphabetical arrangement, the letters are arranged in two groups, one group comprising the letters of most frequent occurrence, while the other group comprises those letters of the least frequent occurrence, and for added convenience and speed of operation, the letters within each of the two groups are arranged within the group in alphabetical arrangement. In certain instances, where large letters are to be used, the alphabet may be divided between two or more stencils, but within each stencil the letters occurring on that stencil are similarly arranged.

In a purely alphabetical arrangement the letters A and B would be arranged adjacent each other in spite of the fact that the letter A occurs six or more times as frequently as the letter B in normal English textual matter. Similarly, the letter Q would normally precede the letter R in spite of the fact that the letter R occurs about 25 times as frequently as the letter Q. By dividing the alphabet into two groups, the lateral shifting of the stencil to position any letter at a desired position adjacent to a previously reproduced letter is greatly minimized, and by positioning the letters of the two groups in groups on the opposite sides of the stencil the frequency of turning of the stencil so that one edge and then another is uppermost is greatly reduced. As an added feature, greatly adding to the ease with which the stencils may be used even without great experience on the part of an operator, the letters within each group are arranged alphabetically so that the operator readily and habitually moves the stencil to the right to expose an E after the operator has exposed an S, and moves the stencil to the right if an A is to follow the letters S and E.

Additionally, the stencils are provided with a series of pairs of indicia lines preferably positioned along the marginal portions of the stencil, each pair of indicia lines being positioned with respect to a letter in one of the groups of letters to indicate the proper spacing between successive letters in a line of textual matter. The indicia lines preferably comprise a pair of convergent lines having a predetermined slope with respect to the edges of the letter spaces of the alphabet whereby the spacing between successive letters in a line of text may be varied.

It will be understood that the foregoing general description and the following detailed description as well are exemplary and explanatory of the invention but are not restrictive thereof.

Of the drawings:

Fig. 1 is a plan view of an illustrative stencil showing the alphabet arranged in two groups according to the frequency with which the letters occur in the English language, Fig. 2 is a plan view of a movable index member used in conjunction with the stencil, Fig. 3 is a plan view showing the index member as applied to the stencil.

Fig. 4 is a detail view showing the relation between the indicia lines and a letter on one stencil, Fig. 5 is a detail view similar to that of Fig. 4 showing the relation between the indicia lines and the same letter, double size, on another stencil, and Fig. 6 is a plan view of a portion of an improved form of the stencil in which the slope of the indicia lines is varied in accordance with the variation in the shapes of the individual letters, one slope being used when the letter occupies substantially all of the edge of the letter space and another slope when it does not.

Referring now in detail to the present preferred and illustrative embodiments of the present invention, as shown in the accompanying drawings:

The stencil is formed as a negative on a sheet of transparent base material provided with opaque portions, such as a high-contrast or photomechanical negative, although, of course, the base material may be translucent. For convenience of illustration, and to avoid excessive areas of solid black in the accompanying drawing, the opaque areas 10 are shown as white, while transparent areas 12 are shown as black, it being understood that when required, the relation of these parts may be reversed so that the letters are opaque on a transparent sheet.

On the stencil are two lines of letter or image elements 14, uniformly spaced from the line 18 which separates the opaque and transparent marginal portions of the sheet stencil, the margins 18 being accurately of the same width, with each line of letter elements uniformly spaced from their respective edges 20 of the stencil. Also uniformly spaced from the edges of the stencil are base lines 22 which indicate the proper base line for the line of composition to be composed from each of the two groups of letter elements.

Within the marginal portions of the stencil are sets of paired convergent indicia lines 24 and 26, the indicia lines 24 being those provided to cooperate with a separately positionable index member 30 to act as a front referencing means for each letter while the other set of indicia lines 26 act as back referencing means. With the movable index member firmly positioned at the point where it is desired to start the textual matter the stencil is moved to bring the front indicia lines 24 into register with the index member 30 and the first letter of the text is exposed. After the exposure the index member is moved into register with the back reference indicia lines 26. Thereafter the index member is held against movement and the stencil is moved to bring the indicia lines 24 of the next letter to be exposed into proper position with the index member 30 and this letter is then exposed as was the first. The procedure is then repeated for each succeeding letter in the textual matter.

The index lines 24—26 are arranged in pairs for each letter and converge with a predetermined slope with respect to the side edges of the letter spaces. The shortest distance between the convergent lines is preferably equal to at least the width of the corresponding letter, or slightly less, but may be equal to the width of the letter plus an additional spacing distance. The divergence of the index lines 24—26 progressively increases the distance between the lines and provides increased spacing distance between succeeding letters. For the illustrative letter shown in Fig. 4 all of the spacing at the top of the convergent index lines 24—26 is provided at the left hand side but the spacing may be provided on either side, both sides or on neither according to the particular letter of the alphabet. In certain types of lettering it is desirable to have the end portions of certain individual letters meet the end portions of successive letters. On a stencil bearing such an alphabet the distance between the upper end portions of the index lines may be slightly less than the width of the appropriate letters.

According to the generally accepted frequency occurrence of the letters of the alphabet in normal English textual matter, the various letters of the alphabet are used in the following order of frequency:

E T A I S O N H R D L U C
      M F W Y P G V B K J Q X Z the letter E being the most frequently used and the letter Z being the least frequently used letter, while the letters C F M and U are used with about equal frequency.

According to the present invention these letters are divided into two groups, and the group of greatest frequency may be comprised of the letters A C D E H I L N O R S T U, while the group of least frequency may be comprised of the letters B F G J K M P Q V W X Y Z. These letters might be arranged in sequence according to their order of occurrence, but if so arranged an inexperienced operator would require a long period of practice to be able to find rapidly the letter desired. Consequently, the letters of the two groups, in the stencils of the present invention have been rearranged to restore them to their alphabetical order within each of the two halves of the frequency order.

Where the size of the individual characters is too great to accommodate the entire alphabet on a single stencil and two stencils are required for that purpose, the letters of greatest frequency will be formed on one stencil, and on that stencil will be divided into two groups, one the letters of greatest frequency within the one half of the alphabet, and the other the letters of the least frequency within the other half of the alphabet.

Thus, on one line there would be provided the letters A, E, I, N, O, R and T, while on the other line, there would be provided the letters C, D, F, H, L and S, while the other stencil would be similarly grouped from the remaining letters.

While the above described arrangement is preferred, for the sake of ease of manufacture, the alphabet could be divided into halves and placed on two stencils, the first stencil bearing the letters A C D E H I and L adjacent one edge and the letters P Q V W X Y and Z adjacent the opposite edge. The remaining letters would appear on the second stencil.

Whether one or more stencils are employed, the letters of the alphabet are so arranged that the letters on one side of the stencil are selected from those letters which have a relatively great frequency of occurrence, while those on the other side have a relatively low frequency of occurrence, thereby reducing the number of times which the stencil need be turned in composing any line.

Separate stencils are usually provided for the upper and lower case letters, and in this case, the letters of the upper case are preferably similarly arranged on the upper case stencil, and the letters of the lower case stencil are arranged in a similar manner.

Figure 3 of the drawing shows a fragment of a stencil similar to that of Figure 1 with a movable indexing member 30 which is adapted to be moved along the edge of the stencil member 10 during or after one exposure and thereafter serves as a guide member to assist the operator in properly positioning the stencil for the next exposure. This indexing guide member 30 preferably comprises a magnetic metallic member 31 to which is rigidly secured a transparent member 32 extending beyond the edge 34 of the magnetic member. On the transparent member 32 are arranged a plurality, usually three, sights 36, 37, 38 (Fig. 2) which are adapted to overlie the index lines 24 or 26 of the stencil, the sights 36, 37 and 38 being positioned at various distances from the guiding edge of the magnetic member 30 and being alined normal to the guiding edge of the magnetic member. Due to the convergence of the lines 24—26 toward the boundary line 18 when sight 36 is being used, the letters will be spaced from each other a minimum distance, when the index sight 37 is used a normal distance, and will be spaced in an open form when the sight 38 is used.

In use, the magnetic member 31 is positioned on a steel base, or is otherwise held temporarily against displacement. The stencil is moved to the proper position with the proper letter in exposure position, its index line 24 properly alined with the sight 36, 37 or 38. After the single letter has been properly positioned, an exposure is made of that letter, and simultaneously the movable indexing member is moved to its proper position with respect to the index mark 26 for the letter just exposed, the stencil and exposed sheet being held fast. After the exposure the stencil is moved until the index mark 24 of the next letter is in the proper position relative to the sight 36, 37 or 38 for the exposure of the next letter.

After the entire line and succeeding lines have been exposed, the sensitive material is developed and otherwise photographically processed in any desired manner to render the line of images visible and capable of further reproduction.

In order to obtain attractive appearing textual matter it is important that successive letters in the text be properly composed. As the proper spacing between the various letters differs with the individual letters it is ordinarily beyond the skill of inexperienced operators to properly compose lines of textual matter. Applicants, by predetermining the location of the index lines 24—26 for the particular letters on the individual stencils, have supplied a means whereby even the most inexperienced operator may produce properly composed and attractive-appearing lines of textual matter.

Whenever it is desired to use letters of varying size another variable factor is introduced into the problem of properly composing successive letters in text. As the size of the letters decreases the spacing between letters becomes proportionately smaller. Due to optical illusion the letters tend to appear to be too close together even though there is, in fact, the same proportionate space between them as between larger letters. To offset the effect of this optical illusion the proportion of the size of the spacing between the letters to the size of the letters must be increased. Applicants' indicia means on the stencils for various sizes of the same alphabet also automatically compensate for this effect. This is achieved by maintaining the vertical height of the index lines 24—26, or the distance between the lines 42, 44, constant on all stencils of the various sizes of the same alphabet regardless of the distance between convergent lines.

This compensating feature is illustrated in Figs. 4 and 5 in which the illustrative letter 40' shown in Fig. 5 is twice as large as the letter 40 in Fig. 4. Also the distance between the indicia lines 24—26' in Fig. 5 is twice as great as the distance betwen the indicia lines 24—26 in Fig. 4 but the distance between the lines 42—44, that is, the vertical height of the indicia lines, is kept constant. The normal position of the index sight 37 is also shown for each letter. Due to the fact that the distance between the lines 42, 44 is the same for both letters the proportion of the spacing to the letter increases as the letter decreases in size. This is shown in Fig. 4 where dot-dash line 46 indicates the position which line 44 would occupy if the distance between 42, 44 were decreased in accordance with the decrease in the letter size and the position index sight 37 would occupy is shown by dotted line 48.

A modification of the invention is shown in Fig. 6 in which the stencil 10' is provided with indicia lines 54, 56 and 64, 66 between the margins 18' and edges 20'. Unlike the previously described illustrative embodiments of the invention the slope of the indicia lines is not constant but varies according to the particular shape of the individual letters. This is indicated in the figure by extending the indicia lines and indicating the angle each one makes with a vertical line 50, the angle formed by the extension of indicia lines 54, 56 being designated as $\alpha$ while the angle formed by the extension of indicia lines 64, 66 is designated as $\varphi$; $\alpha$ being greater than $\varphi$. The purpose of varying the slope of the indicia lines is to overcome the uneven optical distribution of letter spacing arising from the shape of individual letters. When indicia lines of constant slope and the same index sight are used the spacing between letters is constant. Due to the fact that some letters fill up the letter space more completely than others, and some letters have straight edges, while others curved or inclined edges, a constant letter space produces an uneven optical effect which is not pleasing. This can be overcome by varying the position of the index sight along the indicia lines for particular letters so as to increase the letter spacing when two letters having straight edges, i.e. two N's, appear together in the text and to decrease the letter spacing when two letters having curved edges, i.e. two O's appear together. This procedure, however, requires that the operator be familiar with the individual spacing requirements of each letter in the alphabet.

Because the slope of the indicia lines 54, 56 and 64, 66 is varied in accordance with the shape of the individual letters it is possible for an inexperienced operator to obtain varied letter spacing without changing the position of the index sight along the indicia lines. This is illustrated in Fig. 6 in which the letter m is provided with front and back reference indicia lines 54, 56 having the greater slope of angle because of its straight sides. The letter o has front and back reference indicia lines 64, 66 having the lesser slope of angle $\varphi$ because of its curved edges. The letter p has a front reference indicia line 54 of greater slope because its front edge is straight and a back reference indicia line 66 of lesser slope because its back edge is curved. In like manner, the letter q has a front reference indicia line 64 and a back reference indicia line 56 because of its curved front edge and straight back edge.

The slope of the indicia lines may vary over wide limits according to the amount of spacing desired between letters and the stencil may be provided with indicia lines having more than two different angles of slope. For example, a third angle of slope might be provided for letters with inclined edges such as the letters A, V, W and Y, and still another angle for letters such as F, L and T.

The invention in its broader aspects is not limited to the specific mechanisms shown and described but departures may be made therefrom within the scope of the accompanying claims without departing from the principles of the invention and without sacrificing its chief advantages.

What is claimed is:

1. An alphabetic phototypographic reproduction member comprising a transparent base sheet bearing thereon opaque and transparent areas, said areas defining an alphabet of letter elements to be phototypographically reproduced, said letter elements being arranged at a constant distance from a sheet edge, a pair of convergent indicia for each letter element positioned between the letter element and said sheet edge, and means for selectively intercepting each pair of convergent indicia at substantially equal distances from the sheet edge to determine the amount of spacing between adjacent reproduced letter elements.

2. A member as claimed in claim 1 in which the alphabet of letter elements is divided into two series, one of said series comprising those letters of the alphabet of more frequent occurrence in words of the language in which the letters are to be used, and the other series comprising letters of less frequent occurrence, each series being arranged in alphabetical sequence and with respect to opposite sheet edges.

3. A member as claimed in claim 1 in which the smallest distance between the convergent indicia is substantially the same as the width of the corresponding letter element while the greatest distance between the convergent indicia is substantially greater than the width of the corresponding letter element.

4. An alphabetic phototypographic reproduction member as set forth in claim 1 in which each indicium of each pair of indicia is parallel to the corresponding indicium of the other pairs.

5. A set of alphabetic phototypographic reproduction members comprising a plurality of transparent sheets each bearing thereon opaque and transparent areas, said areas defining a series of letter elements differing in size on each reproduction member, each letter element being provided with a pair of convergent indicia between the letter element and the adjacent edge of the sheet, the distance between the pair of indicia varying in accordance with the width of the letter element but having a constant height normal to the edge of the sheet, and means for selectively intercepting each pair of convergent indicia at the same distance from the sheet edge to determine the amount of spacing between adjacent reproduced letter elements.

6. A set of alphabetic phototypographic reproduction members as set forth in claim 5 in which the pairs of indicia converge at a uniform angle.

7. An alphabetic phototypographic reproduction member comprising a transparent sheet bearing thereon opaque and transparent areas, said areas defining a series of letter elements, each letter element being provided with a pair of convergent indicia between the letter element and the adjacent edge of the sheet, the slope of said indicia varying in accordance with the shape of the letter element to produce properly spaced textual matter, and means for selectively intercepting each pair of convergent indicia at the same distance from the sheet edge to determine the amount of spacing between adjacent reproduced letter elements.

8. An alphabetic phototypographic reproduction member as set forth in claim 7 in which the slope of the indicia is increased when the letter element substantially fills one edge and decreased when it does not substantially fill one edge.

9. An alphabetic phototypographic reproduction member as set forth in claim 7 in which the slope is increased when the letter element has a straight edge and decreased when the letter element has a curved edge.

References Cited in the file of this patent

UNITED STATES PATENTS

| | | |
|---|---|---|
| 1,237,239 | Bunnell | Aug. 14, 1917 |
| 1,259,355 | Bunnell | Mar. 12, 1918 |
| 2,098,928 | Wenczler | Nov. 9, 1937 |
| 2,160,750 | Meyer | May 30, 1939 |